(12) United States Patent
Mensch et al.

(10) Patent No.: US 12,509,920 B2
(45) Date of Patent: Dec. 30, 2025

(54) VEHICLE DOOR HAVING A HANDLE ASSEMBLY

(71) Applicant: Witte Automotive GmbH, Velbert (DE)

(72) Inventors: Reinaldo Mensch, Wuppertal (DE); Partick Handl, Dormagen (DE); Karsten Steinhauer, Essen (DE)

(73) Assignee: Witte Automotive GmbH, Velbert (DE)

( * ) Notice: Subject to any disclaimer, the term of this patent is extended or adjusted under 35 U.S.C. 154(b) by 169 days.

(21) Appl. No.: 18/320,239

(22) Filed: May 19, 2023

(65) Prior Publication Data

US 2023/0374828 A1  Nov. 23, 2023

(30) Foreign Application Priority Data

May 20, 2022 (DE) .................. 10 2022 205 048.7

(51) Int. Cl.
*E05B 79/06* (2014.01)
*E05B 81/76* (2014.01)
*B60R 25/31* (2013.01)

(52) U.S. Cl.
CPC .............. *E05B 79/06* (2013.01); *E05B 81/76* (2013.01); *B60R 25/31* (2013.01); *B60R 2325/103* (2013.01)

(58) Field of Classification Search
CPC .......... E05B 79/06; E05B 81/76; E05B 81/77; E05B 81/64; E05B 85/10
See application file for complete search history.

(56) References Cited

U.S. PATENT DOCUMENTS

| | | | |
|---|---|---|---|
| 6,923,481 B2 | 8/2005 | Bruderick et al. | |
| 9,156,335 B1* | 10/2015 | Harter | E05B 85/10 |
| 2021/0172217 A1* | 6/2021 | Linden | E05B 81/78 |
| 2023/0090723 A1* | 3/2023 | Peynot | E05B 79/06 |
| | | | 292/336.3 |

FOREIGN PATENT DOCUMENTS

| | | |
|---|---|---|
| CN | 101688408 A | 3/2010 |
| CN | 102785624 A | 11/2012 |
| CN | 103216139 A | 7/2013 |

(Continued)

OTHER PUBLICATIONS

European Patent Office, Extended European Search Report for application No. EP23174232.1, dated Oct. 18, 2023, 7 pages.

(Continued)

*Primary Examiner* — Christine M Mills
*Assistant Examiner* — Christopher F Callahan
(74) *Attorney, Agent, or Firm* — Marshall & Melhorn, LLC

(57) ABSTRACT

A vehicle door having a handle arrangement. The vehicle door includes a door support structure and a channel strip that is arranged on the upper side of the door support structure. The handle assembly has at least one handle element and at least one first sensor module, where the first sensor module can be arranged and fixed on the outside on an upper side of the door support structure. The first sensor module has at least one coupling interface for automatically coupling the first sensor module to the handle element and/or to an optional second sensor module.

10 Claims, 4 Drawing Sheets

(56) References Cited

FOREIGN PATENT DOCUMENTS

| | | |
|---|---|---|
| DE | 102015102898 U1 | 8/2015 |
| DE | 102014107809 A1 | 12/2015 |
| DE | 102016123724 A1 | 6/2018 |
| DE | 102019131339 A1 | 5/2021 |
| DE | 102020132363 A1 | 6/2021 |
| EP | 2535489 A2 | 12/2012 |

OTHER PUBLICATIONS

Chinese Patent Office, Search Report in applictaion No. CN202310566610.7, dated Jul. 31, 2025, 11 pages.

* cited by examiner

VEHICLE DOOR HAVING A HANDLE ASSEMBLY

BACKGROUND

The invention relates to a vehicle door having a handle assembly.

Door handles for vehicle doors are known in principle and are used, for example in motor vehicles, in order to enable a keyless unlocking of the vehicle. Sensors of these door handles are designed in the form of capacitive proximity switches, i.e., they measure the capacitance between an active electrode and an electrical ground potential.

SUMMARY

It is an object of the present invention to specify a vehicle door having a handle assembly that is simple to assemble. Moreover, it is an object of the invention to specify a vehicle comprising such a vehicle door having an improved handle assembly.

The vehicle door according to the invention comprises at least one handle assembly and a door support structure, wherein the handle assembly comprises at least one handle element, at least one first sensor module and optionally a second sensor module, wherein the first sensor module can be arranged and fixed on the outside of an upper side of the door support structure, and at least one coupling interface for automatically coupling the first sensor module to a vehicle-side component, in particular a door support structure, for example a structural section, a channel strip and/or a support strip, and/or to the handle element and/or optionally to the second sensor module.

The advantages achieved with the invention are in particular that a vehicle door having such a multi-functional and multi-sensor handle assembly can be installed simply and cost-effectively. In addition, such a handle assembly requires less installation space. Moreover, the conventional recessed handle can be omitted given an arrangement of the handle assembly at a channel strip in the internal structure of the door. Thus, in a simple and cost-effective manner, a flush-mounted design is achieved relative to conventional, cost-intensive, extensible handle systems.

The vehicle door can in particular have a channel strip that is arranged on the upper side of the door support structure. Depending on the embodiment of the door support structure, the first sensor module can be arranged on the door support structure, in particular on an angled structural surface or a structural section and/or on the channel strip and/or the support strip.

In one possible embodiment, the at least one coupling interface is designed to be self-centering in order to automatically couple and/or connect, in particular mechanically and/or electrically, the coupling interface of the first sensor module to a corresponding mating coupling interface of the respective handle element, the respective door support structure, the respective channel strip and/or the respective second sensor module when the handle element and/or the second sensor module is mounted to the first sensor module or when the first sensor module is mounted to the door support structure and/or the channel strip.

For example, the at least one coupling interface of the first sensor module can be designed as a plug-in module. The plug-in module can, for example, be a number of contact elements, for example a number of plug-in contacts for an electrical connection and/or a number of centering contacts for mechanically centering the coupling interface with the mating coupling interface and/or a number of connecting contacts for mechanical, in particular form-fitting and/or force-fitting connection of the coupling interface to the mating coupling interface. In this case, the respective contact element can be configured in such a way that it is simultaneously used for the electrical connection, the centering and the mechanical connection. In other words, A single contact element can simultaneously be designed as a plug-in contact, centering contact and connecting contact.

A further development provides that the complementary mating coupling interface of the handle element, the door support structure, the channel strip and/or the second sensor module is designed as a plug-in receiving module. The plug-in receiving module can, for example, be a number of mating contact elements, for example a number of plug sockets for an electrical connection and/or a number of centering sockets for mechanically centering the coupling interface with the mating coupling interface and/or a number of connecting sockets for mechanical, in particular form-fitting and/or force-fitting connection of the coupling interface to the mating coupling interface. In this case, the respective mating contact element can be configured in such a way that it is simultaneously used for the electrical connection, the centering and the mechanical connection. In other words, A single mating contact element can simultaneously be designed as a plug socket, centering socket and connecting socket.

In an alternative, in particular reversed, embodiment, the first sensor module can comprise the above-described mating coupling interface, and the handle element, the second sensor element, the door support structure and/or the channel strip can comprise the coupling interface described above.

The coupling interface and the mating coupling interface are preferably designed to be self-centering in order to at least partially produce an electrical and/or a mechanical connection between them when they are connected to each other. For example, an electrical connection can be made automatically when the first sensor module is plugged together with the handle element and/or the second sensor module.

For example, the at least one coupling interface can be designed as an electrical plug-in module having electrical plug-in contacts. In particular, the at least one coupling interface is designed as an automatic coupling device that is self-centering in the mounting direction in order in particular to automatically mechanically and/or electrically connect the coupling interface of the first sensor module to corresponding mating coupling interfaces of the handle element, the door support structure, the channel strip and/or the second sensor module when the handle element and/or the second sensor module is mounted to the first sensor module or when the first sensor module is mounted to the door support structure and/or to the channel strip.

According to one further development, in the connected state of the coupling interface and mating coupling interface, the first sensor module and the second sensor module can be arranged one above the other and at a predetermined distance from each other in order to be coupled to each other by signal. For example, the first sensor module and the second sensor module are designed as a so-called "MoC sensor module" having mutually opposite metal surfaces, which are arranged so as to be movable relative to each other in order to generate a sensor signal, in particular a measuring signal for a changing distance and/or a changing electric field between the metal surfaces.

A further embodiment provides that the first sensor module comprises a first coupling interface that can be coupled to a first mating coupling interface of the handle element and/or the second sensor module, and a second coupling interface that can be coupled to a second mating coupling interface of the door support structure. For example, the first coupling interface is formed on an upper side of the first sensor module, and the second coupling interface is formed on an underside of the first sensor module. In addition, the first sensor module can be screwed to the door support structure.

Depending on the vehicle door, this can also have a vehicle frame which adjoins the door support structure.

With regard to the vehicle, the object is achieved according to the invention by at least one vehicle door as described above.

DESCRIPTION OF THE FIGURES

Embodiments of the invention are explained in greater detail below, with reference to the accompanying drawings.

Parts corresponding to one another are provided with the same reference signs in all the drawings.

DETAILED DESCRIPTION

Figure 1:
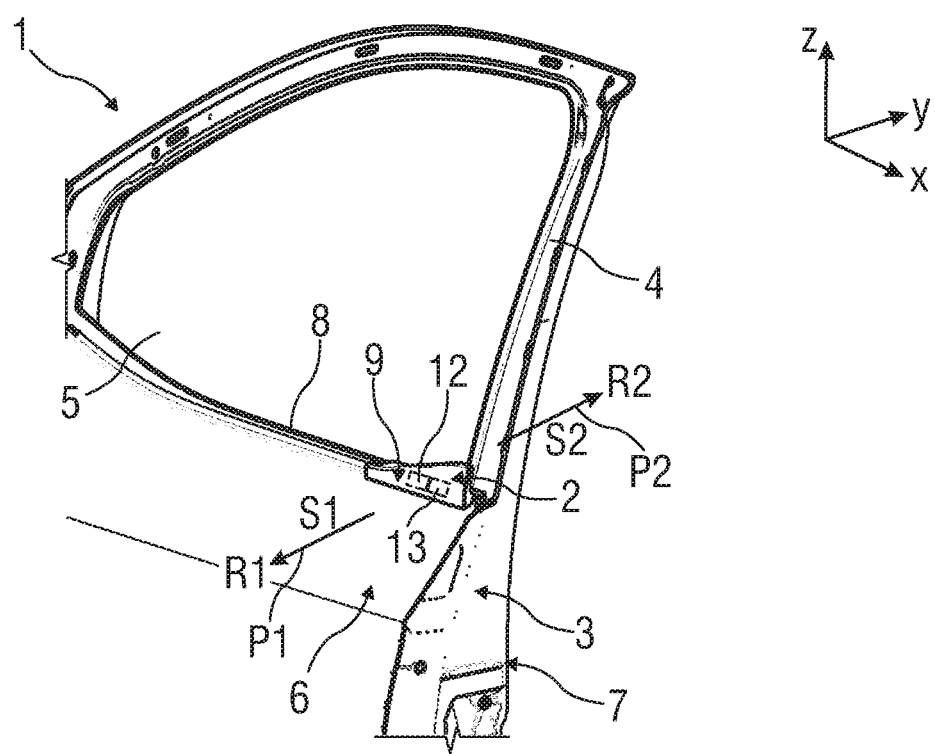
FIG. 1 shows a schematic perspective view of a vehicle door having a handle assembly.

FIG. 1 is a schematic perspective view of a vehicle door 1 having a handle assembly 2. The handle arrangement 2 is an external door handle.

The vehicle door 1 comprises a door support structure 3 and a door frame 4. Alternatively, the vehicle door 1 can be designed so as to be frameless (not shown) and have no door frame 4, for example given a convertible. The invention is applicable both to vehicle doors 1 comprising a door frame 4 and to frameless vehicle doors 1. The invention is described below for a vehicle door 1 having a door frame 4.

The door frame 4 has a window aperture 5 which can be closed by a window pane (not shown in greater detail). For this purpose, the window pane is arranged movably in the door support structure 3 in the usual manner, in particular between a closed position in which the window pane is raised and the window aperture 5 is closed, and an open position in which the window pane is lowered into the door support structure 3 and the window aperture 5 is opened.

The door support structure 3 has, for example, an exterior vehicle skin 6 and an interior vehicle skin 7. The door support structure 3 is made of a sheet metal which is usually painted. The door support structure 3 can be clad on the inside.

The vehicle door 1 can also have a channel strip 8. The channel strip 8 is arranged on the upper side of the door support structure 3. A narrow longitudinal gap, through which the window pane is moved, is provided at the door support structure 3, for example on the upper side. The channel strip 8 is arranged in the region of the longitudinal gap and extends at least in regions along the door support structure 3 on both sides of the window pane. The channel strip 8 serves to seal between the door support structure 3 and the window pane. A penetration, in particular of water, dirt, snow, but also of wind, into the door support structure 3 is therewith prevented.

The channel strip 8 usually comprises two soft sealing lips that are situated on both sides of the window pane. They are movable so that noise is avoided upon moving the window pane.

The handle assembly 2 is arranged movably, in particular pivotably, at the channel strip 8 and/or the door support structure 3.

Alternatively, the handle arrangement 2 can be designed to be movable in translation, in particular displaceable or shiftable (not shown in greater detail). The invention can be applied both to a rotationally movable handle arrangement 2 and to a handle arrangement 2 movable in translation. The invention is described below for a rotationally movable, in particular pivotable, handle assembly 2.

The handle arrangement 2 comprises a handle element 9 which can be gripped on an outside of the vehicle door 1. Thus, the handle assembly 2 is arranged on the outside of the channel strip 8 and/or the door support structure 3 and in a wet region.

The handle element 9 is designed in such a way that it is designed as a device that can be operated in at least two directions R1, R2 for actively actuating at least two switching functions. Alternatively, the handle element 9 can also be designed for active actuation of at least two switching functions only in one of the directions R1 or R2.

The handle element 9 protrudes perpendicularly upwards from the channel strip 8 and/or the door support structure 3. The handle element 9 is thereby arranged at a distance from the door frame 4.

The handle assembly 2 is designed as a multi-sensor and multi-functional handle module. The handle assembly 2 comprises, for example, a first sensor module 12 and a second sensor module 13.

Such a movable multi-sensor and multi-functional handle assembly 2 provided on the channel strip 8 and/or the door support structure 3, in particular on a structural surface or a structural section, can be of compact design and easy to assemble and allows a plurality of switching functions and requires little installation space.

Figure 2:
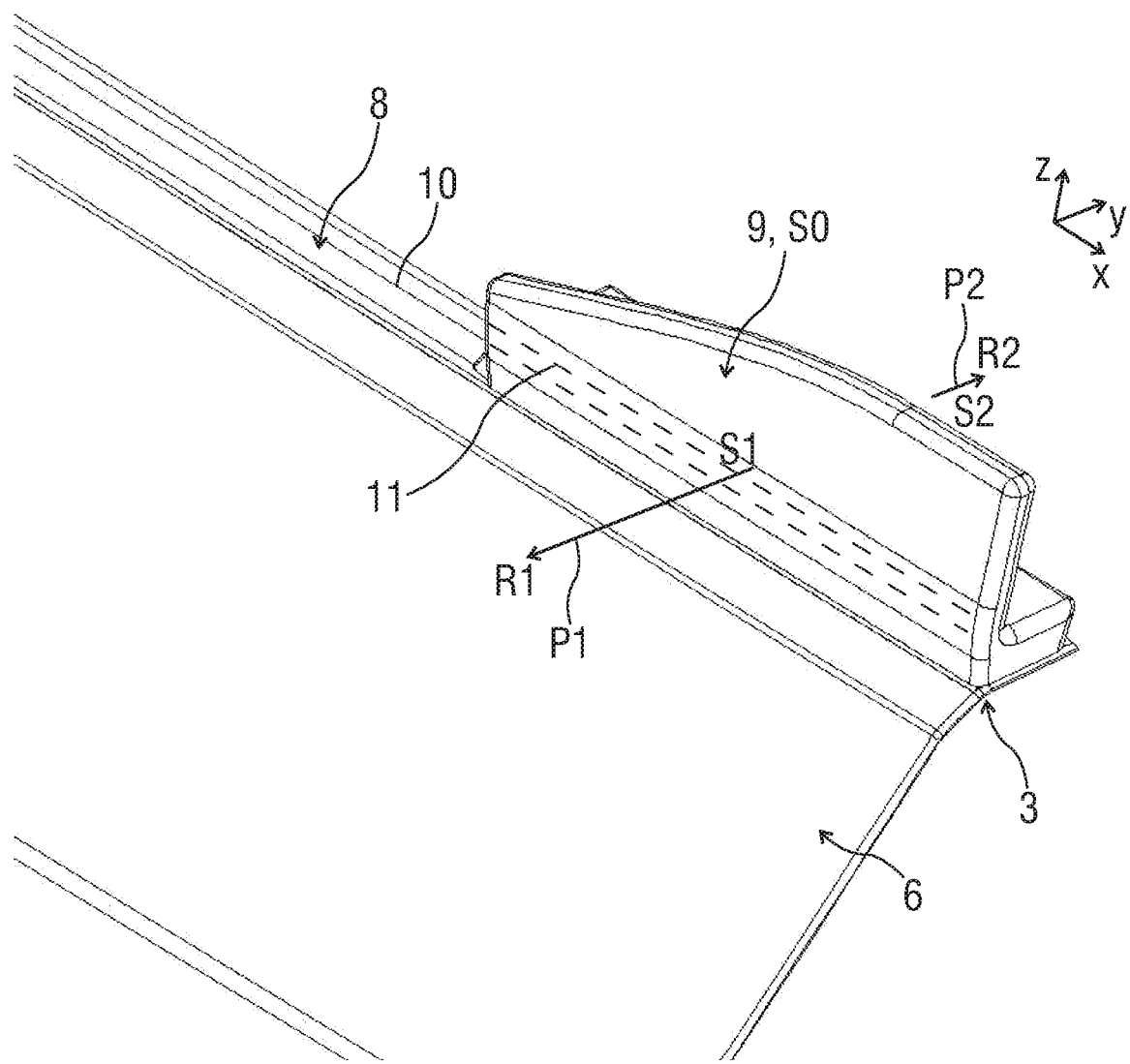
FIG. 2 shows a schematic enlarged detail of the perspective presentation view to FIG. 1 in the region of the handle assembly.

FIG. 2 schematically shows an enlarged detail of the perspective view according to FIG. 1 in the region of the handle assembly 2.

The channel strip 8 can additionally comprise a support strip 10 protruding substantially perpendicularly. The support strip 10 can be part of the door support structure 3 and can be designed, for example, as an extended section. The support strip 10 can be of flexible design. The support strip 10 can additionally be designed as a sealing lip.

The support strip 10 extends at least over a region or section along the channel strip 8 and/or the door support structure 3. The handle arrangement 2 is arranged on the support strip 10, in particular positively and/or non-positively, and mounted so as to be movable in a limited manner. In particular, the handle assembly 2 is movably mounted on the support strip 10, in particular so as to be movable in translation or in rotation, for the smallest movements of the handle element 9, for example in a range from 0.1 mm to 5 mm, in particular 0.1 mm to 2 mm, or 1 degree to 10 degrees, in particular 1 degree to 5 degrees.

Figure 3:
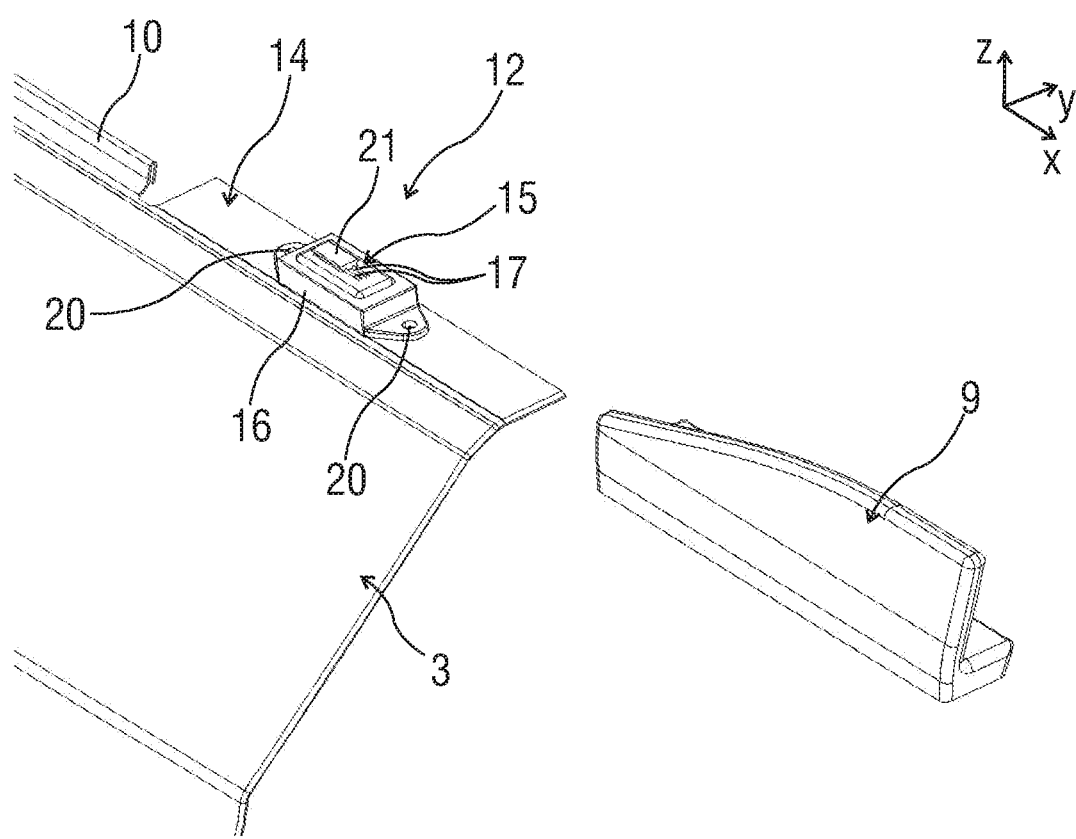
FIG. 3 shows a schematic enlarged exploded view of a vehicle door with the first sensor module already mounted and prior to automatic coupling to a handle element to be mounted with a second sensor module.

For example, the handle element 9 comprises a groove 11 corresponding to the support strip 10, in particular a longitudinal groove. The handle assembly 2 can be slipped onto the support strip 10, in particular vertically from above, or can be pushed on, in particular horizontally along the support strip 10, or attached, in particular mounted, on a structural surface or a structural section of the door support structure 3. In the assembled state of the handle assembly 2 on the vehicle door 1, the support strip 10 is arranged completely in the groove 11, as shown in FIG. 2. FIG. 3 shows a further example, wherein the support strip 10 is arranged only in regions in the groove 11.

The handle element 9 is, for example, ergonomically shaped and can be gripped, in particular encompassed, by one hand of a user. The handle element 9 can thereby be arranged so as to be displaceable, in particular pivotable, between a first switching movement S1, directed away from the vehicle door 1, in the direction R1, and a second switching movement S2, directed towards the vehicle door 1, in the direction R2. Different switching functions can hereby be parameterized, as is described in more detail below.

Figure 4:
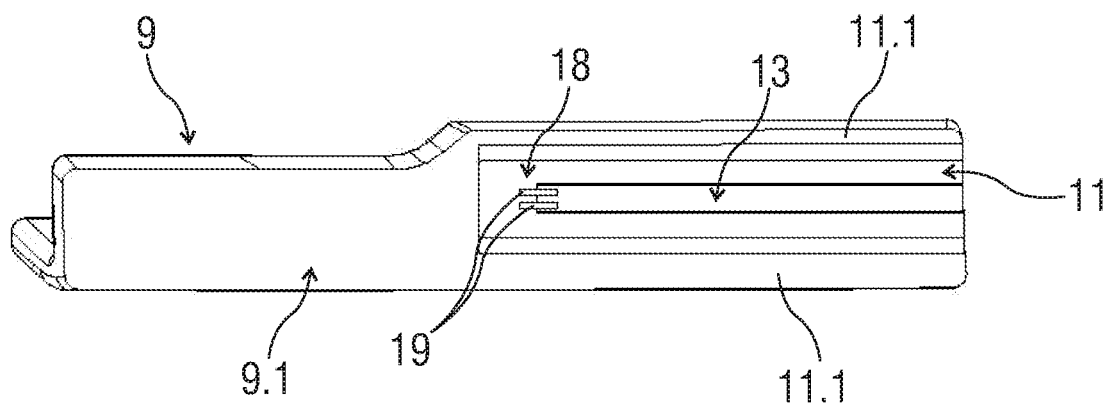
FIG. 4 shows a schematic perspective view of an underside of a handle element.

FIG. 3 schematically shows an enlarged view of the vehicle door 1 with the first sensor module 12 already mounted and prior to automatic coupling of the first sensor module 12 to the handle element 9 to be mounted with the optional second sensor module 13, which is premounted or integrated in the handle element 9 (shown in FIG. 4).

The first sensor module 12 can be arranged and fixed on the outside of an upper side of the door support structure 3. In particular, the first sensor module 12 is arranged on a planar structural section 14 of the door support structure 3. This planar structural section 14 is formed as a supporting structural section angled perpendicular to the vertically oriented door support structure 3. The support strip 10 ends in front of the planar structural section 14 and extends vertically upward from the door support structure 3 perpendicular to the planar structural section 14. The planar structural section 14 can also be formed by a section of the support strip 10. For example, an end section of the support strip 10 can be separated from the vertical section of the support strip 10 by means of a vertical section and bent by 90° in order to form the planar structural section 14 for receiving the first sensor module 12.

The first sensor module 12 comprises at least one coupling interface 15 for automatically coupling the first sensor module 12 to a vehicle-side component 16, for example a battery and/or an on-board power supply system, and/or to the handle element 9 and/or to the second sensor module 13 (shown in FIG. 4).

For example, the at least one coupling interface 15 is designed as an electrical plug-in connection having a plurality of plug-in contacts 17. In particular, the at least one coupling interface 15 is designed as an automatic coupling device that is self-centering in order to automatically connect it to a corresponding mating coupling interface 18, in particular mating contacts 19, for example plug sockets, of the handle element 9 and/or the second sensor module 13 when the handle element 9 and/or the second sensor module 13 is coupled to the first sensor module 12.

The first sensor module 12 can additionally be mounted and fastened on the planar structural section 14, for example, by means of a screw connection 20.

The first sensor module 12 is, for example, a capacitive sensor or an inductive sensor.

The first sensor module 12 comprises, for example, two metal surfaces, which are arranged at a distance from each other, are not shown in detail and are movable relative to each other. Such a sensor is also referred to as an "MoC sensor" (MoC=metal over cap or metal over capacitive, or as a capacitive tactile sensor). The metal surfaces are also referred to as MoC plates.

For example, a first metal surface is arranged on a fixed carrier part of the first sensor module 12 which is fixed to the door support structure 3, and a second metal surface is arranged on a movable carrier part of the sensor module 12 and/or the movable handle element 9, in particular the second sensor module 13.

The second metal surface, for example a metal strip or a thin metal sheet, is arranged on one side of the movable support part or of the handle element 9, in particular is fastened, for example glued or soldered, or is designed as part of the second sensor module 13.

An actuation, in particular pivoting, of the handle element 9 produces a corresponding movement, in particular pivoting or vertical movement, of the movable support part, and therewith of the second metal surface relative to the first metal surface. In particular, the handle element 9 is displaceable, in particular pivotable, between the first switching movement S1 in the direction R1 away from the vehicle door 1 and the second switching movement S2 in the direction R2 towards the vehicle door 1 (as shown in FIGS. 1 and 2). In the non-actuated state, the handle element 9 is positioned in a starting position S0. Upon actuation, the handle element 9 can be pivoted in a range between +/−5° with respect to the initial position S0, according to the arrows P1, P2.

The distance between the first metal surface and the second metal surface can be in the range of 0.1 to 2 mm and, for example, can be 1 mm or 1.5 mm. The intervening space between the metal surfaces preferably has a dielectric medium, which is, for example, a gas, in particular air, and/or an elastically deformable solid, such as a plastic foam or the like.

An electronic unit 21 (shown in FIG. 3) of the handle assembly 2 detects a change in the distance between the metal surfaces and/or a capacitance change or inductance change, caused by the movement of the handle element 9. A minimum movement, in particular pivoting, of the handle element 9 and of the movable support part, caused by a contacting of the handle element 9, can thereby already lead to a corresponding rotation of the second metal surface relative to the first metal surface. A change, resulting therefrom, in the distance between the two metal surfaces leads to a corresponding capacitance change or inductance change which can be detected by means of the electronic unit 21.

By means of the movable support part, the handle element 9 fastened thereto can be moved in different, in particular opposite and/or perpendicular, directions R1, R2. A plurality of switching points or switching functions can hereby be generated. A locking of a lock of the vehicle door 1 and/or of the vehicle can thus be switched, for example by means of a pressure force which acts on the handle element 9. An unlocking of the lock of the vehicle door 1 and/or of the vehicle can be switched by means of a tensile force which acts on the handle element 9.

The second sensor module 13 can, for example, be a capacitive proximity switch on the handle element 9, in particular for the contactless exchange of data, in particular signals, of the electronics unit 21 for one or more switching functions, for example for unlocking or locking the vehicle. The second sensor module 13 comprises, for example, a near-field communication antenna (NFC antenna) and a near-field communication sensor. The second sensor module 13, designed for example as a capacitive proximity switch, is arranged in particular on the outside of the handle element 9. It is understood that, for a proper functioning of the proximity switch, it is to be ensured that the active electrode of the proximity switch is not metallically shielded.

The handle element 9 and/or the second sensor element 13 each comprise an associated or a common mating coupling interface 18. The mating coupling interface 18 comprises one or more mating contacts 19, in particular mating contacts 19 corresponding to the plug-in contacts 17, for example plug sockets.

When the handle element 9 is mounted with the premounted or integrated second sensor 13, the handle element 9 is, for example, pushed horizontally onto the support strip 10 or the structural section 14. In particular, the handle element 9 is pushed onto the support strip 10 or the structural section 14 until the coupling interface 15 and the mating coupling interface 18 are automatically coupled to one another, in particular coupled to one another in a form-fitting and/or force-fitting manner, in particular electrically.

Figure 5:
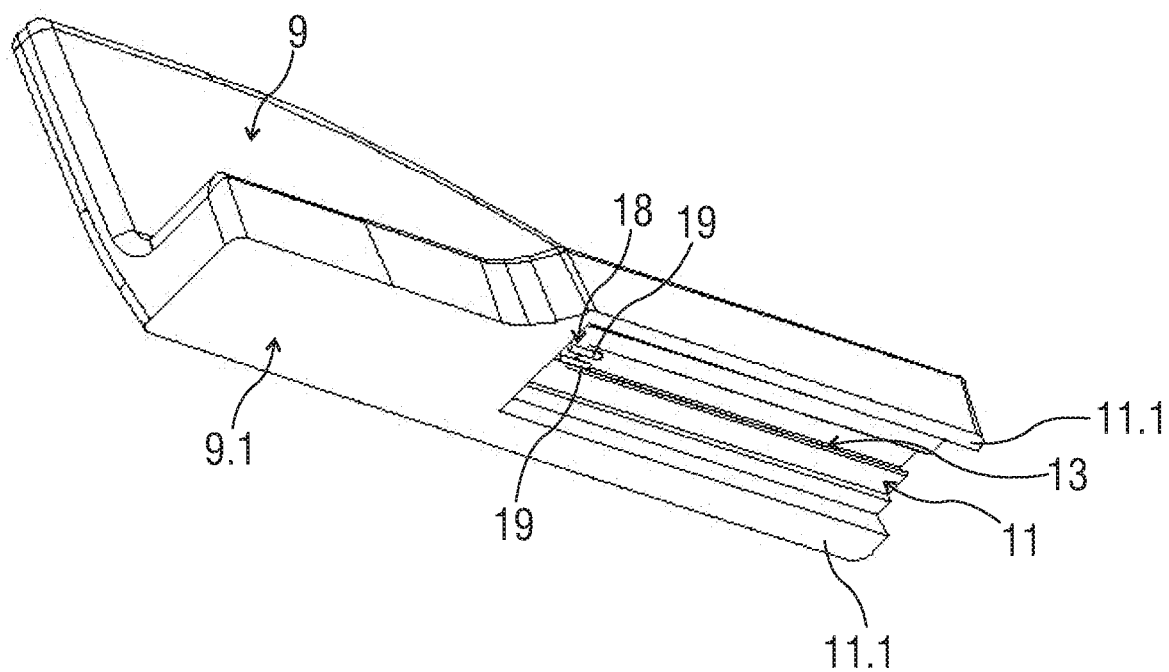
FIG. 5 shows a further schematic perspective view of the underside of the handle element.

FIGS. 4 and 5 show the handle element 9 in perspective views from below.

The handle element 9 has the groove 11, in particular a longitudinal groove, or an elongated recess in its underside 9.1, by means of which the handle element 9 can be slipped or pushed onto the support strip 10 or the structural section 14.

The second sensor module 13 and/or the second metal surface of the first sensor module 12, in particular a mating metal surface, is or are arranged centrally in groove 11. The second sensor module 13 and/or the second metal surface extend along the groove 11.

The underside 9.1 is complementary to the planar structural section 14 of the door support structure 3 (shown in FIG. 3) and is substantially flat. The groove 11 has a planar edge 11.1. As a result, the handle element 9 rests flush against the planar structural section 14 in the mounted state.

When the handle element 9 is in a mounted state on the structural section 14, the two sensor modules 12, 13 are arranged protected in the inner groove 11 of the handle element 9; in particular, they are completely surrounded by the body of the handle element 9 and encapsulated to the outside.

The invention makes it possible to construct the handle assembly 2 in a modular and variable manner, in particular with or without sensor modules 12, 13 or only with one of the sensor modules 12 or 13 or with both sensor modules 12 and 13. For example, one of the sensor modules 13 is premounted or integrated on the handle element 9. The other sensor module 12 is premounted on the door support structure 3. By means of a plug-in connection, the coupling interface 15 and the mating coupling interface 18 can be automatically coupled, in particular electrically connected, when the one sensor module 12 is joined to the handle element 9.

LIST OF REFERENCE SIGNS

1 Vehicle door
2 Handle assembly
3 Door support structure
4 Door frame
5 Window aperture
6 Exterior vehicle skin
7 Interior vehicle skin
8 Channel strip
9 Handle element
9.1 Underside
10 Support strip
11 Groove
11.1 Edge
12 First sensor module
13 Second sensor module
14 Planar structural section
15 Coupling interface
16 Vehicle-side component
17 Plug-in contact
18 Mating coupling interface
19 Mating contact
20 Screw connection
21 Electronic unit
P1, P2 Arrow
R1, R2 direction
S0 Starting position
S1, S2 Switching movement

The invention claimed is:

1. A vehicle door comprising a handle assembly, wherein the vehicle door comprises at least one door support structure, and the handle assembly comprises at least one handle element and at least one first sensor module, wherein the first sensor module is arranged and fixed on the outside on an upper side of the door support structure, and wherein the first sensor module comprises at least one coupling interface for automatically coupling the first sensor module to the handle element and the first sensor module to a second sensor module, wherein the handle element and/or the second sensor module comprising a corresponding mating coupling interface, wherein the coupling interface and the mating coupling interface are configured self-centering in order to automatically couple and/or connect with each other when coupling the handle element to the first sensor module, wherein the handle element comprises a groove in which the second sensor module is attached, wherein the first sensor module is located within the groove adjacent the second sensor module when the handle element is on the door support structure, wherein the first module is electrically plugged into the second module.

2. The vehicle door as in claim 1, wherein the door support structure, a structural section, a support strip and/or a channel strip comprises the corresponding mating coupling interface which is self-centering in order to automatically couple and/or connect the coupling interface of the first sensor module to the corresponding mating coupling interface when coupling the first sensor module to the door support structure, to the structural section, to the support strip and/or to a channel strip.

3. The vehicle door as in claim 1, wherein the at least one coupling interface of the first sensor module is designed as a plug-in module.

4. The vehicle door as in claim 2, wherein the complementary mating coupling interface of the handle element and/or the second sensor module is designed as a plug-in receiving module.

5. The vehicle door as in claim 2, wherein the coupling interface and the mating coupling interface are designed to be self-centering in order to at least partially produce an electrical and/or a mechanical connection between them when they are connected to each other.

6. The vehicle door as in claim 2, wherein the coupling interface and the mating coupling interface are designed to be self-centering in a mounting direction.

7. The vehicle door as in claim 2, wherein, in the connected state of the coupling interface and mating coupling interface, the first sensor module and the second sensor module are arranged above each other and at a predetermined distance from each other in order to be coupled to each other by signal.

8. The vehicle door as in claim 2, wherein the first sensor module comprises a further coupling interface, that can be coupled to a further mating coupling interface of the door support structure.

9. The vehicle door as in claim 1, wherein the first sensor module is screwed to the door support structure.

10. A vehicle comprising at least one vehicle door as in claim 1.

* * * * *